Dec. 18, 1962 R. W. REACH, JR 3,069,566

SYNCHRONOUS LOGICAL CIRCUIT

Filed Aug. 12, 1960

INVENTOR.
ROY W. REACH, JR.

BY Fred Jacob

ATTORNEY

United States Patent Office 3,069,566
Patented Dec. 18, 1962

3,069,566
SYNCHRONOUS LOGICAL CIRCUIT

Roy W. Reach, Jr., Sudbury, Mass., assignor to Minneapolis-Honeywell Regulator Company, Minneapolis, Minn., a corporation of Delaware Filed Aug. 12, 1960, Ser. No. 49,261
8 Claims. (Cl. 307—88.5)

This invention relates to a new and improved circuit for use in digital computers and, in particular, to a single-ended logical circuit whose operation is synchronous with a clock signal.

Present-day digital computers generally operate in the binary numerical system owing to the ease with which electrical circuitry of different kinds may be adapted to such use. Many electrical circuits and components are essentially bistable in nature, i.e. capable of residing in one or the other of two stable conditions which are readily equated with the corresponding mathematical binary functions.

The information in a binary digital computer is generally represented by bilevel signals, i.e. signals which have one of two possible voltage (or current) levels to represent either a binary Zero and a binary One. A bistable device, for example a conventional flip-flop circuit, is adapted to respond to bilevel signals by switching from one stable state to the other. These stable states are frequently referred to as the set and reset state respectively.

Alhough a bistable electrical component is normally symmetrical in construction and requires a pair of input signals for its operation, it may be adapted for use with single-ended logical circuits so as to operate with signals applied to a single input.

Single-ended logic is frequently required by a particular computer system and has the additional advantage of reducing the amount of input circuitry associated with each bistable circuit. Moreover, the reliability of the logical circuit is enhanced as a result of the reduction in the amount of input equipment and further due to the necessity for timing only a single input signal.

In presently available logical circuits, a conventional gating structure is directly connected to the bistable device for coupling more than one input signal to the latter. Thus, either an "and" gate is employed which requires the presence of input signals on all of its inputs in order to provide an output pulse, or a buffering arrangement is used wherein an output pulse is provided in the presence of an input signal on only one of its inputs. Suitable combinations of these circuits within the gating structure are possible in order to obtain the desired computer logic.

However, the direct application of the input signals to a bistable device, such as a flip-flop circuit for example, is attended by a number of difficulties. Among these is the loading effect of the flip-flop circuit on the gating structure which causes the latter to operate inefficiently. When this occurs, the pulses for triggering the flip-flop fail to provide sufficient power to effect rapid switching. If the operation of the flip-flop is too slow to satisfy the timing requirements of the computer, as determined by the computer clock, the performance of the logical circuit may be seriously affected.

The problem is further aggravated where the logical circuit operation is such as to require the bistable device to be set or reset periodically. Since the period normally follows the clock pulse interval, switching stable states at too slow a rate may seriously hamper the operation of the logical circuit.

Accordingly, it is the primary object of this invention to provide a circuit which is not subject to the foregoing disadvantages.

It is another object of this invention to provide a single-ended logical circuit wherein a gating structure is efficiently coupled to a bistable device without any sacrifice in the switching speed of the latter.

It is a further object of this invention to provide a single-ended logical circuit wherein input signals are efficiently gated to a bistable device in synchronism with an applied clock signal.

It is an additional object of this invention to provide a single-ended logical circuit wherein input signals are gated to a bistable circuit in synchronism with applied clock pulses to reset the bistable circuit unconditionally at clock pulse intervals and to set it only in accordance with the applied input signals.

The invention which forms the subject matter of this application consists of a synchronous logical circuit in which a single-ended bistable device is connected to a gating structure by means of a coupling circuit. A clock signal, consisting of unipolar, clipped pulses, is applied to the coupling circuit and acts not only to synchronize the application of the input signals, but also to supply the power to the bistable storage device which effects the switching operation. In operation, the clock signal is effective to reset the storage device at clock pulse intervals, while setting it at predetermined periods only in accordance with the input signals applied to the gating structure.

The various novel features which characterize the invention are pointed out with particularity in the claims annexed to and forming a part of this specification. For a better understanding of the invention, its advantages and specific objects thereof, reference should be had to the following detailed description and accompanying drawings in which:

Figures 1, 2:
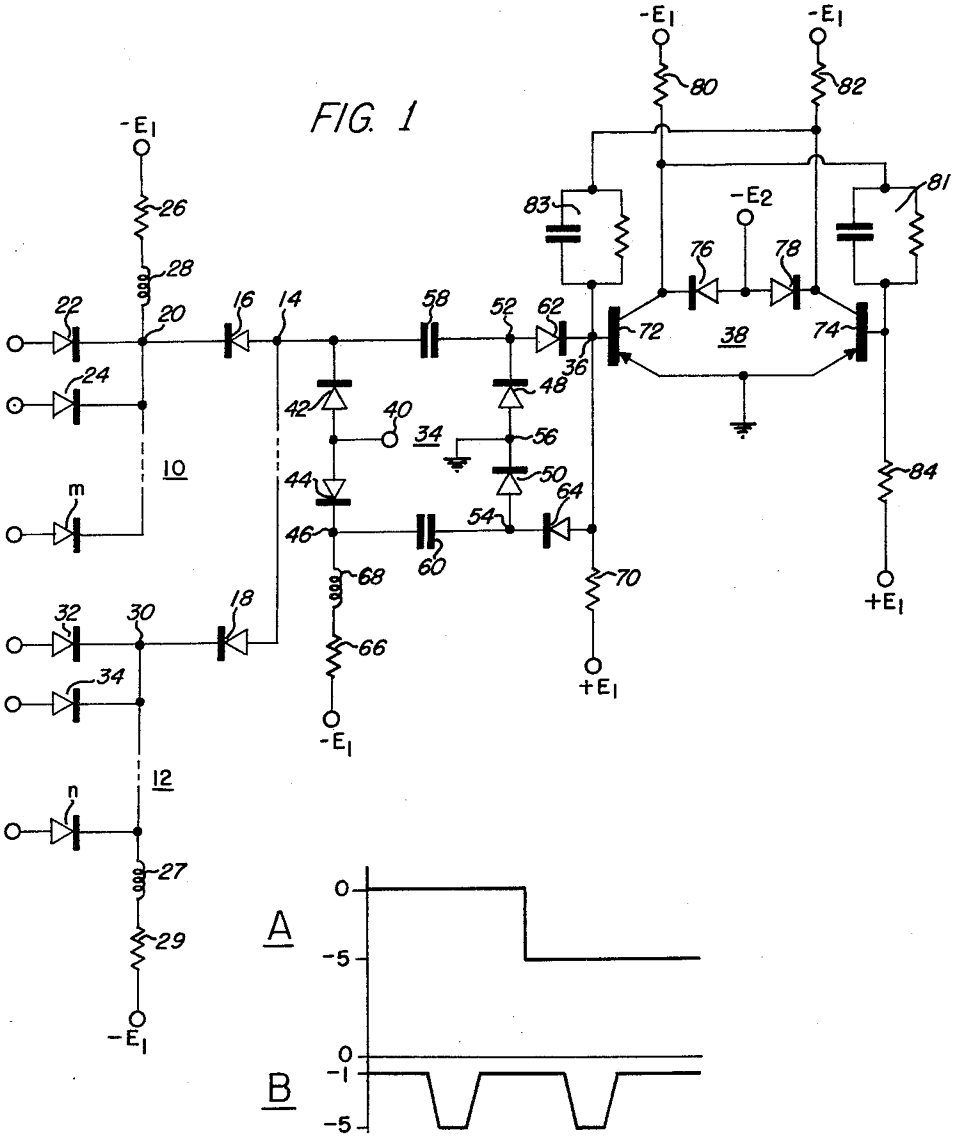
FIGURE 1 illustrates a preferred embodiment of the invention.
FIGURE 2 illustrates the wave forms of the applied signals.

With reference now to the drawings, the preferred circuit which is illustrated in FIGURE 1 comprises a gating structure which is seen to include two "and" gates 10 and 12 which are buffered to the output 14 of the gating structure by the diodes 16 and 18 respectively. The gate 10 is seen to have a plurality of input terminals which are coupled to junction point 20 by means of diodes 22, 24 . . . *m*. As indicated by the broken line in the drawing, the number of input terminals is not limited to that illustrated. The last-mentioned diodes are poled in opposition to the diode 16 which is connected between the junction point 20 and the output 14. A negative D.C. potential $-E_1$ is coupled to the junction point 20 by means of a resistor 26 and an inductance 28.

Gate 12, which is similar to the above-described gate 10, includes a plurality of input terminals which are coupled to a junction point 30 by means of diodes 32, 34 . . . *n*. The diodes are poled in opposition to the diode 18 which is connected between the junction point 30 and the gating structure output 14. The last-mentioned connection is illustrated by means of a broken line to indicate that additional gates may be buffered to the output 14. The negative D.C. potential source —E, is coupled to the junction point 30 by way of a resistor 29 and an inductance 27.

A bistable device 38, which takes the form of a flip-flop circuit herein, has a single input 36 which is connected to the output 14 of the gating structure by means of a coupling circuit 34. The coupling circuit includes a pulse terminal 40 which is adapted to receive a clock signal. A pair of diodes 42 and 44 is connected between the output 14 and a junction point 46 respectively, and the aforesaid terminal 40. The diodes 42 and 44 are poled to conduct current away from the terminal 40. A second pair of diodes 48 and 50 is connected between a pair of junction points 52 and 54 respectively, and a reference point 56 which is shown grounded in the drawing. The diodes 48 and 50 are poled to conduct current in the same direction.

A condenser 58 is connected between the output 14 and the junction point 52, and a condenser 60 is connected between the junction points 46 and 54 respectively. The junction points 52 and 54 are further coupled to the aforesaid single input 36 of the flip-flop circuit 38 by means of a pair of diodes 62 and 64 poled in opposite directions. The junction point 46 is coupled to the aforesaid source of negative D.C. potential $-E_1$ by means of a resistor 66 and an inductance 68. The single input 36 is coupled to a source of positive D.C. potential $+E_1$ by means of a resistor 70.

The flip-flop circuit 38 comprises a pair of transistors 72 and 74 whose emitters are jointly connected to ground. The transistor collectors are coupled to a source of negative D.C. potential $-E_2$ by means of a pair of diodes 76 and 78 which are poled to conduct current to the respective transistor collectors. The collectors are further coupled to the aforesaid source of negative D.C. potential $-E_1$ by means of a pair of resistors 80 and 82 respectively. The base of the transistor 72 is connected to the single input 36 which, as stated above, is resistively coupled to the positive D.C. source $+E_1$. The base of the transistor 74 is similarly coupled to the positive D.C. source $+E_1$ by means of a resistor 84. Each transistor base is further coupled to the collector of the other transistor by means of a parallel resistor-condenser combination 81 and 83 respectively.

The operation of the circuit illustrated in FIGURE 1 will be explained with the aid of the wave forms shown in FIGURE 2. The input signals applied to each input terminal of the gates 10 and 12 are bilevel in nature, i.e. they have one of two possible voltage levels. As shown in FIGURE 2A, these voltage levels are either zero or negative. As an example, without limiting the invention, the amplitude of $-E_1$ may be —30 volts, $+E_1=+30$ volts, $+E_2=-5$ volts, and the negative voltage level illustrated in FIGURE 2A may be —5 volts. FIGURE 2B illustrates the clock signal which is applied to the pulse terminal 40. The clock is seen to consist of clipped, periodically recurring negative pulses whose maximum amplitude may be —5 volts and which revert to a negative voltage level of —1 volt.

When negative level input signals are applied to all of the input terminals of one gate, such as gate 10, the diodes 22, 24 . . . *m* are cut off. A negative potential of less than —1 volt then appears at the output 14 of the gating structure due to the coupling action of the resistor 26 and the inductance 28 and leakage across the diode 16. If the clock signal applied to the pulse terminal 40 is at the —1 volt level at this instant, the diode 42 becomes conductive. The current path which is thus established between the pulse terminal 40 and the $-E_1$ source includes the diode 42, diode 16, inductance 28 and resistor 26. Likewise, a current path is established by way of diode 42, diode 18, inductance 27 and resistor 29. Accordingly, the output 14 of the gating structure is clamped approximately to —1 volt.

The application of the —1 volt clock signal to the pulse terminal 40 establishes a further current path through the diode 44 whose threshold level is exceeded. The latter current path extends between the pulse terminal 40 and the $-E_1$ source and includes the diode 44, inductance 68 and resistor 66. Accordingly, the junction point 46 is clamped approximately to —1 volt.

If the input signals applied to one or more of the input terminals of the gate 10 are at ground, the corresponding input diodes become conductive and the junction point 20 is clamped to ground. Similarly, if one or more of the input terminals of the gate 12 are grounded, the junction point 30 is clamped to ground. As long as a —1 volt clock signal is applied to the pulse terminal 40, the diodes 16 and 18 respectively remain cut off. Leakage across the diode 42 still allows the output 14 to be at the —1 volt level even though the diode 42 is cut off. The diode 44, however, is conductive and the junction point 46 is again clamped to the —1 volt level.

When these conditions obtain, the diode 50 becomes conductive and a current path is established between the pulse terminal 40 and ground which enables the condenser 60 to charge to a level which is no greater than —1 volt. If the voltage on the base of the transistor 72, i.e. the voltage on the input 36, is assumed to be approximately +½ volt, the minimum level to which the condenser 60 is able to charge by way of the diode 64 which becomes conductive under these circumstances, is —1½ volts.

Upon the arrival of a clock pulse, the terminal 40 is driven to —5 volts and the diodes 42 and 44 respectively are cut off. The current flowing in the resistor 66 and in the inductance 68 is now directed through the condenser 60 and the diode 64, to the single input terminal 36 of the flip-flop circuit 38. The voltage which is thus coupled to the input terminal 36 via the condenser 60 and the diode 64, causes the transistor 72 to saturate. If the transistor 72 was previously in its cut-off state, the application of the signal to the input 36 produces a regenerative action by way of the parallel resistor-condenser combination 81, which is coupled to the base of the transistor 74, and from there by way of the parallel resistor-condenser combination 83 back to the base of the transistor 72. Accordingly, the transistor becomes saturated while the transistor 74 is cut off. This is termed the reset state of the flip-flop circuit. If the latter was previously in the reset state, the regenerative action which occurs in phase does not change.

While the above-described charging of the condenser 60 occurs, the charge on the condenser 58 remains unaffected. This is due to the fact that the diode 42 is cut off by the —5 volt level of the clock signal, while the diodes 16 and 18 are cut off due to the application of zero voltage input signals to the input terminals of the gates 10 and 12 respectively.

If, however, the input signals applied to all of the input terminals of one of the gates, e.g. the gate 10, are at —5 volts during this interval, the diode 16 is no longer cut off. Under these conditions, the condenser 58 charges to —5 volts through a current path which includes the diode 48, the condenser 58, diode 16, inductance 28 and resistor 26. Upon the termination of the clock pulse when the clock signal returns to the —1 volt level, the potential on the output 14 of the gating structure returns to —1 volt and the 4-volt positive charge on the condenser 58 is coupled into the base circuit of the transistor 72. This action cuts off the transistor 72 and, as a consequence of the above-described regenerative action, it causes the transistor 74 to assume a saturated condition. This condition of the flip-flop circuit 38 is herein termed the set state and occurs conditionally only at the end of a clock pulse when all the input signals applied to one of the gates 10 and 12 have a negative voltage level.

From the foregoing description of the operation of preferred embodiment of the invention, it will be clear that the bistable device 38 is unconditionally reset at the begining of each clock pulse and is conditionally set at the end thereof. The foregoing operation is carried out in a simple circuit which is economically constructed and which employs a unipolar clock signal and single-ended logic. Since the power for switching the bistable device 30 is derived from the clock signal, the load presented to the gating structure by the bistable device is small. As a result, the operation of the gating structure is efficient and the switching time of the bistable device is not slowed down.

It will be apparent from the foregoing disclosure of the invention that numerous modifications, changes and equivalents will now occur to those skilled in the art, all of which fall within the true spirit and scope contemplated by the invention.

What is claimed is:

1. A logical circuit comprising a gating structure, means for applying bilevel input signals to said gating structure, one of said input signal levels being adapted to render said gating structure conductive, a bistable device having a single input, a coupling circuit connecting said gating structure to said bistable device, said coupling circuit including first and second energy storage means, a pair of oppositely poled unilaterally conductive means for connecting said first and second energy storage means respectively to said single input, and means for applying a unipolar clock signal to said coupling circuit, said coupling circuit being adapted to couple said clock signal through said first energy storage means to unconditionally reset said device to one of its stable states and being further adapted to couple said input signal having said one signal level to said device through said second energy storage means to set it to its other stable state.

2. A logical circuit comprising a gating structure, means for applying input signals to said gating structure, a bistable device having a single input, a coupling circuit including first and second energy storage means coupled to said gating structure, a pair of oppositely poled unilaterally conductive means for connecting said first and second energy storage means respectively to said single input, and means for applying a unipolar clock signal to said coupling circuit; whereby said clock signal acting through said energy storage means unconditionally resets said device to one of its stable states, but sets it to its other stable state only in accordance with said applied input signals.

3. A logical circuit comprising a gating structure, means for applying input signals to said gating structure, a bistable device having a single input, a dual path coupling circuit connecting said gating structure to said single input, said coupling circuit including energy storage means, and means for applying a clock signal to said coupling circuit; whereby said clock signal acting through said energy storage means in one of said paths unconditionally resets said bistable device to one of its stable states, but sets it to its other stable state only in accordance with said applied input signals acting through the other one of said paths.

4. A logical circuit comprising a gating structure, means for applying input signals to said gating structure, a bistable flip-flop circuit having a single input, a coupling circuit including first and second capacitive storage means coupled to said gating structure, oppositely poled unilaterally conductive means for connecting said capacitive storage means to said single input, and means for applying unipolar clock pulses to said coupling circuit, said coupling circuit being adapted to couple said clock pulses through said first capacitive storage means to said flip-flop circuit to reset the latter unconditionally upon the initiation of each clock pulse, said coupling circuit being further adapted to permit the charging of said second capacitive storage means only in the presence of a predetermined input signal to set said flip-flop circuit upon the termination of a clock pulse.

5. A logical circuit comprising a gating structure, means for applying unipolar input signals to said gating structure having either a first or a second voltage level, a bistable flip-flop circuit having a single input, a coupling circuit including first and second capacitive storage means coupled to said gating structure, oppositely poled unilaterally conductive means for connecting said capacitive storage means to said single input, and means for applying unipolar clock pulses to said coupling circuit, said flip-flop circuit being unconditionally reset upon the initiation of each clock pulse coupled thereto by way of said first capacitive storage means, but being set upon the termination of a clock pulse only in the presence of input signals having said first voltage level and coupled thereto by way of said second capacitive storage means.

6. A synchronous logical circuit comprising a gating structure, said gating structure including at least one "and" gate having a plurality of input terminals and a single output terminal, means for applying input signals to said input terminals, said input signals having a voltage level which is either negative or zero, a bistable flip-flop circuit having a single input, a coupling circuit connected between the output of said gating structure and said single input, said coupling circuit comprising a pair of condensers coupled to said gating structure, a first pair of diodes poled in opposite directions and connected between said single input and the output terminals of said condensers, means for coupling a positive D.C. potential to said single input, a second pair of diodes poled in the same direction and connected in series between said condenser output terminals, the junction point of said second diode pair being connected to a reference point, a third diode pair connected between the input terminals of said condensers, means for applying clock pulses to the junction point of said third diode pair, said clock pulses having either a first or a second negative voltage level, and means for coupling a negative D.C. potential to the input terminal of one of said condensers, said flip-flop circuit being reset upon the initiation of each clock pulse, but being set upon the termination of a clock pulse only in the presence of an input signal having a negative voltage level.

7. A synchronous logical circuit comprising a gating structure, said gating structure including at least one "and" gate having a plurality of input terminals, means for applying bilevel input signals to said input terminals, said "and" gate including a diode connected between each of said input terminals and a first junction point poled to conduct in the direction of the latter, a series-connected resistor-inductance combination for coupling a first negative D.C. potential to said first junction point, a diode having one terminal connected to said first junction point poled to conduct in the direction of the latter, the other terminal of said last-recited diode constituting the output of said gating structure, a coupling circuit including second, third and fourth junction points, a clock pulse terminal for applying clock pulses having either a first or a second negative voltage level, a first pair of diodes connected to said clock pulse terminal and being poled to conduct current away therefrom, said diodes being further connected to said gating structure output and said second junction point respectively, a first condenser connected between said gating structure output and said third junction point, a second condenser connected between said second and fourth junction points, a series-connected resistor-inductance combination for coupling said first negative D.C .potential to said second junction point, a reference point, a second pair of diodes poled alike and connected between said third and fourth junction points, said second pair of diodes being jointly connected to said reference point, a bistable circuit having a single input, a diode connected between said third junction point and said single input and poled to conduct in the direction of the latter, a diode connected between said single input and said fourth junction point and poled to conduct in the direction of the latter, means for resistively coupling a positive D.C. potential to said single input, said bistable circuit including a pair of transistors, one of said transistors having its base connected to said single input, a parallel resistor-condenser combination connected between the base of each one of said pair of transistors and the collector thereof, the emitters of said transistors being coupled to said reference point, means for resistively coupling said first negative potential to the collector of each of said transistors, means for resistively coupling said positive D.C. potential to the base of the second one of said transistors, and means for diode coupling a second negative D.C. potential to said transistor collectors.

8. The apparatus of claim 7 wherein said gating structure comprises a plurality of "and" gates buffered to the output thereof, and means for applying bilevel input signals to the input terminals of each of said "and" gates.

References Cited in the file of this patent

UNITED STATES PATENTS

| | | |
|---|---|---|
| 2,762,936 | Forrest | Sept. 11, 1956 |
| 2,918,587 | Rector et al. | Dec. 22, 1959 |
| 2,965,767 | Wanlass | Dec. 20, 1960 |